Oct. 30, 1962  H. HOPPE ET AL  3,061,052
CENTRIFUGAL SPEED GOVERNOR ACTING AS BRAKE CONTROL
Filed Nov. 9, 1960  2 Sheets-Sheet 1
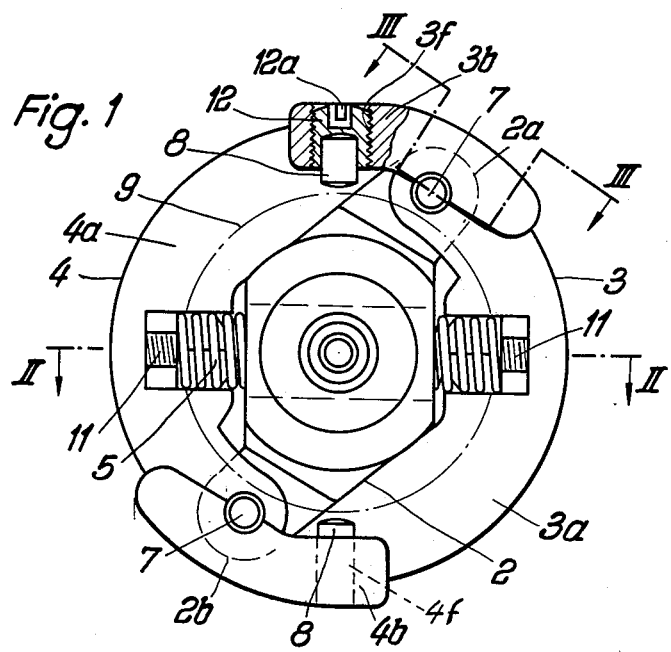
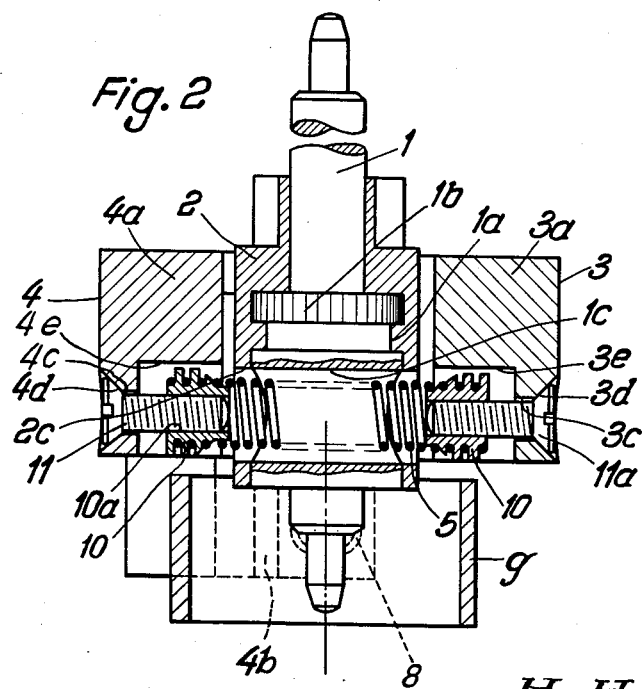
Inventors
H. Hoppe
K. Zaehler Oct. 30, 1962     H. HOPPE ET AL     3,061,052
CENTRIFUGAL SPEED GOVERNOR ACTING AS BRAKE CONTROL
Filed Nov. 9, 1960     2 Sheets-Sheet 2

Inventors
H. Hoppe
K. Zaehler
By Glascock Downing Seebold
Attys.

3,061,052
CENTRIFUGAL SPEED GOVERNOR ACTING
AS BRAKE CONTROL
Hans Hoppe, Berlin-Lichterfelde, and Klaus Zaehler, Berlin-Lankwitz, Germany, assignors to Krone Kommanditgesellschaft, Berlin-Zehlendorf, Germany
Filed Nov. 9, 1960, Ser. No. 68,165
Claims priority, application Germany Nov. 18, 1959
5 Claims. (Cl. 188—136)

The invention relates to a centrifugal speed governor acting as brake control, and having two fly weights which are pivotably mounted on two supports connected to the governor shaft, each of which fly weights urges a brake block against the wall of a drum, located coaxially relative to the governor shaft against the biassing action of a spring, when a certain limit speed is exceeded.

One object of the present invention is the construction of a speed governor or braking device in which the fly weights lie in one plane while extensions connecting them with braking shoes lie in another plane.

Another aim of the invention is to make possible the construction of such a governor in which the flyweights are drawn together by a single tension spring to which they are attached by readily accessible screws.

However, there are other improvements also forming objects of the present invention and these and the objects already hinted at will now be elucidated with reference to the following description of one embodiment of the invention, and to the drawings forming part of the specification.

In said drawing:

FIG. 1 is a partly sectionalized view of the centrifugal speed governor according to the invention, the brake drum being indicated by the dash-dot line;

FIG. 2 is a cross-section along the line II—II of FIG. 1;

Figure 3:
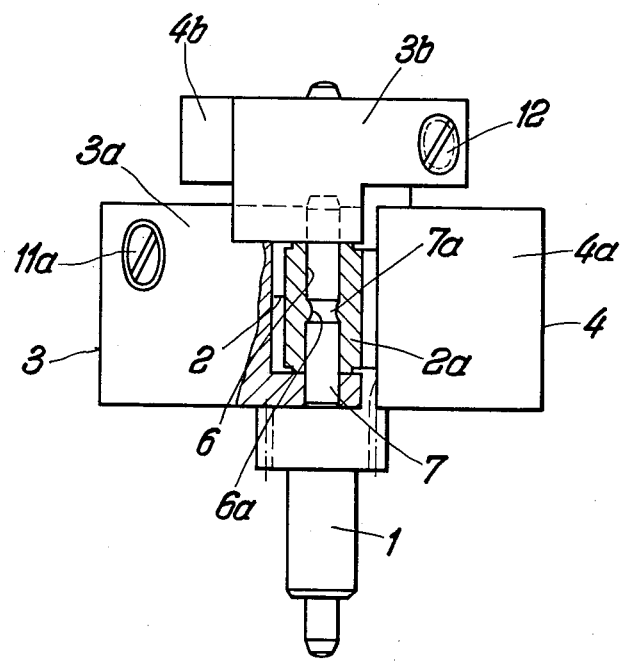
FIG. 3 is a cross-section along the line III—III of FIG. 1.

Referring now to the drawing, the centrifugal speed governor mounted on the governor shaft 1 comprises essentially a body member 2, mounted on the shaft so as to prevent its independent rotation; two fly weights 3, 4, pivotally mounted on the member 2, and a return or holding helical spring 5, connecting both fly weights.

The body member 2 is made of a suitable synthetic resin and may be mounted on the governor shaft 1, for example, by pressing or extrusion, and held thereon axially by a groove 1a in the shaft 1 and the serrated collar 1b (see FIG. 2) has two diametrally opposed projections 2a and 2b, which form the supports for the fly weights 3 and 4.

To this end, each projection 2a, 2b (see FIG. 3) has a longitudinal bore parallel to the governor shaft 1, each bore having in its centre region an annular restriction 6a, formed by a bulged projection. In the longitudinal bores 6 of projections 2a and 2b of the body member 2, there is mounted a bearing pin or pivot pin 7, having in its centre region an annular restriction or groove 7a, corresponding to the restriction 6a, and by means of which it is held captive in the bore. The fitting of the bearing pin 7 into the bore 6 is made possible by the deflection movement of the wall of bore 6, consisting of a resilient material, for example, a plastic, whereby this narrower part 6a moves first aside and then returns resiliently into the groove 7a of the pin 7, when the fixing position is reached.

The pins 7 carry the fly weights 3, 4, which consist of a longer arm 3a and 4a, respectively, to which is connected the return spring 5, and of a shorter arm or extension 3b and 4b, respectively, equipped with the braking device or shoe, explained further below.

Preferably, the arms 3a, 3b, and 4a, 4b, respectively of the fly weights are made integrally, but so arranged that the shorter arms or extensions 3b, 4b are located above the arms 3a, 4a (see FIG. 3). The outer ends of the shorter arms 3b, 4b, of the fly weights 3 and 4 carry brake blocks 8, which rest against the surface of revolution of a brake drum 9 mounted so as to be incapable of rotation (shown by the dash-dotted line in FIG. 1) when a certain limit speed is reached. This brake drum constitutes a body of revolution.

At speeds below this limit speed, the fly weights 3, 4, are pulled inwards by the return spring 5 connected to their longer arms 3a, 4a, so that the brake blocks 8 are not in contact with the drum 9.

The return spring 5 is connected at both its ends, by adjusting means to be explained later, to the fly weights 3, 4, and passes, in its centre region, through a bore 1c of the governor shaft, arranged perpendicularly to the axis of rotation of the governor shaft 1, and through a coaxial bore 2c of the body 2.

Both ends of the spiral spring 5 carry intermediate elements or units 10, which are equipped with helical grooves or external threads, the diameter and pitch of which correspond substantially to the corresponding values of the spring. In addition, these units 10 have tapped inner bores 10a, into which are screwed adjusting screws 11. These adjusting screws 11 pass freely through bores 3c and 4c, respectively, in the longitudinal sides of the fly weights 3, 4, and rest, with their heads 11a in a corresponding recess 3d and 4d, respectively, of the fly weights.

As is clear from the drawing, rotation of the externally accessible screws 11 will alter the spring tension of the spiral spring 5, making possible the easy adjustment of the holding or returning force exerted on the flyweights 3, 4. In order to prevent the units 10 from twisting, they are prismatic, for example, hexagonal, so that they are axially displaceable in the longitudinal direction of spring 5, whilst being incapable of rotating in the recesses 3e and 4e, respectively of flyweights 3 and 4. The recesses are correspondingly shaped. They are open downwards in an axial direction.

In order to facilitate the screwed connection of the units 10, adapted to receive the adjusting screws 11, into the spiral spring 5, the external thread of plugs 10 is tapered continuously on the side facing the spring 5, until it reaches a diameter corresponding to the internal diameter of this spring 5 (see FIG. 2).

As may be seen in FIG. 1, the brake blocks 8 are mounted in screwed studs 12, for example, by being pressed in place; these studs 12 are mounted in the tapped bores 3f and 4f, respectively, of the flyweights 3, 4, and are longitudinally adjustable in them. To this end, the studs 12 have, on their outer ends, slots 12a, allowing them to be engaged by a screw rotating tool, for example, by a screwdriver.

The adjustability of the brake blocks, provided additionally to the adjustment of the return spring, makes it possible to equalize easily any manufacturing tolerances occurring during the production of the flyweights and brake blocks, as well as the easy adjustment which may become necessary after prolonged operation.

While one embodiment of the instant invention has been described in detail so that those skilled in the art may make full use of the invention, it is to be understood that various modifications can be made in the structure described without departing from the spirit or scope of the invention.

What we claim is:

1. A centrifugal braking device comprising; a body of revolution mounted so as to be prevented from rotating about its axis, and having a face turned radially outwards;

a body member mounted for rotation about an axis substantially coinciding with the axis of the body of revolution; a pair of flyweights pivotally attached to the body member for pivotal movement each about a pivoting eccentric axis substantially parallel to the axis of rotation, the flyweights being arcuate and being arranged together so as to form a segmented hoop-like structure concentric with the axis of rotation of the body member; resilient means connected to the flyweights and tending to pivot them towards the axis of rotation; rotatable screws connecting the resilient means to the flyweights, the heads of these screws being exposed in the radially outer direction for varying tension in the resilient means by means of a screw-rotating tool; a pair of rigid extensions each connected with one of the flyweights at such a point that on the flyweights pivoting away from the axis of rotation, the extensions swing about the pivot axes towards the axis of rotation of the body member, each of these extensions lying out of the plane of the hoop and overlapping the ends of the flyweight to which it is not attached; brake shoes arranged to be driven inwards by the extensions, when the flyweights move outwards away from the axis of rotation, so as to engage the outwardly turned face on the body of revolution.

2. The structure as set forth in claim 1 comprising intermediate elements into which the screws are screwed, the resilient means being in the form of a single helical elongated tension spring whose ends are attached to the intermediate elements, the last-named being accommodated in recesses in the flyweights in such a manner that they can move radially with respect to the axis of rotation of the body member but cannot rotate about the axes of the screws.

3. The structure as set forth in claim 2 in which the recesses in the flyweights are open in an axial direction.

4. The structure as set forth in claim 2 in which the ends of the spring are screwed into helical grooves in the intermediate elements, the parts of the latter extending into the recesses being prismatic, while the recess faces turned towards the prismatic faces of the intermediate elements are also correspondingly prismatic for the purpose of preventing rotation of the intermediate elements.

5. The structure as set forth in claim 4 in which the parts of the intermediate elements which have helical grooves taper down to the bore of the spring in a radially inward direction.

References Cited in the file of this patent

UNITED STATES PATENTS

| | | |
|---|---|---|
| 725,591 | Rossiter | Apr. 14, 1903 |
| 1,088,079 | Leavitt | Feb. 24, 1914 |
| 1,101,726 | Catucci | June 30, 1914 |
| 1,851,718 | Merle | Mar. 29, 1932 |